United States Patent [19]

Dauphinee

[11] 4,197,743
[45] Apr. 15, 1980

[54] APPARATUS FOR MEASURING BAROMETRIC PRESSURE

[75] Inventor: Thomas M. Dauphinee, Ottawa, Canada

[73] Assignee: Canadian Patents & Development Limited, Ottawa, Canada

[21] Appl. No.: 4,323

[22] Filed: Jan. 17, 1979

[30] Foreign Application Priority Data

Feb. 10, 1978 [CA] Canada .................................. 296947

[51] Int. Cl.² ........................... G01L 7/08; G01L 9/12
[52] U.S. Cl. ....................................... 73/384; 73/701; 73/724
[58] Field of Search ................. 73/384, 701, 755, 724, 73/723, 715, 385, 386

[56] References Cited

U.S. PATENT DOCUMENTS

| | | | |
|---|---|---|---|
| 2,388,542 | 11/1945 | Hobbs | 73/384 |
| 2,646,682 | 7/1953 | Ovtschinnikoff | 73/386 |
| 2,677,279 | 5/1954 | Rich | 73/384 |
| 2,755,667 | 7/1956 | Jacobs et al. | 73/386 |
| 3,238,781 | 3/1966 | Peters | 73/384 |
| 3,701,283 | 10/1972 | Lichfield | 73/701 |

*Primary Examiner*—Donald O. Woodiel
*Attorney, Agent, or Firm*—J. R. Hughes

[57] ABSTRACT

Apparatus for measuring barometric pressure comprising a housing made of high thermal conductivity metal and defining a cavity therein, a diaphragm of flexible spring type material clamped in position across the cavity dividing it into upper and lower portions, a connecting passage leading from the lower portion of the cavity to the pressure to be measured, electrical means for measuring deflections of the diaphragm and providing a control signal to a power supply, a low boiling point liquid filling part of the upper portion of the cavity in the housing, with vapor from the liquid filing the remaining part, a heating coil positioned in relation to the housing and connected to the power supply controlled by the electrical means such as to bring the temperature of the liquid and thus its vapor pressure to a level to balance the pressures across the diaphragm, thermal insulation encompassing the housing and means for measuring the temperature of the housing and the liquid therein, this temperature being related to the pressure being measured.

4 Claims, 3 Drawing Figures

TO CONTROL AND MEASURING CIRCUITRY

TO PRESSURE TO BE MEASURED

APPARATUS FOR MEASURING BAROMETRIC PRESSURE

This invention relates to apparatus for measuring barometric pressure.

There has been problems in measuring pressure at remote locations accurately and reliably with the minimum power utilization. An example of this requirement is pressure measuring devices on moored buoys which depend on limited battery power. Long term stability of better than ±1 mbar (millibar=1/1000 atmospheres (atmos)) and resolution to 0.5 mbar is essential. Compatibility with data logging and transmission techniques and systems is also essential. For devices of this kind a±50 mbar range is normally sufficient.

Up to the present time, the devices used for this task have been potentiometer or capacitor coupled aneroid barometers or quartz bar oscillators with special cuts to respond by change of natural frequency to end pressure from a diaphragm. Coupled aneroid barometers have been seriously unstable and tend to show large hysteresis effects. The quartz bar system is superior but does have stability problems and is a somewhat expensive device.

It is an object of the present invention to provide a barometer to measure pressure at remote locations accurately and reliably with minimum power utilization.

This and other objects of the invention are achieved by apparatus for measuring barometric pressure comprising a housing made of high thermal conductivity metal and defining a cavity therein, a diaphragm of flexible spring type material clamped in position across the cavity to the pressure to be measured, a low boiling point liquid filling part of the upper portion of the cavity in the housing, with vapor from the liquid filling the remaining part, electrical means for measuring deflections of the of the diaphragm and providing a control signal to a power supply, a heating coil positioned in relation to the housing and connected to the power supply controlled by the electrical means such as to bring the temperature of the liuqid and thus its vapor pressure to a level to balance the pressures across the diaphragm, thermal insulation encompassing the housing and means for measuring the temperature of the housing and the liquid therein, this temperature being related to the pressure being measured.

In drawings which illustrate embodiments of the invention:

Figure 1:
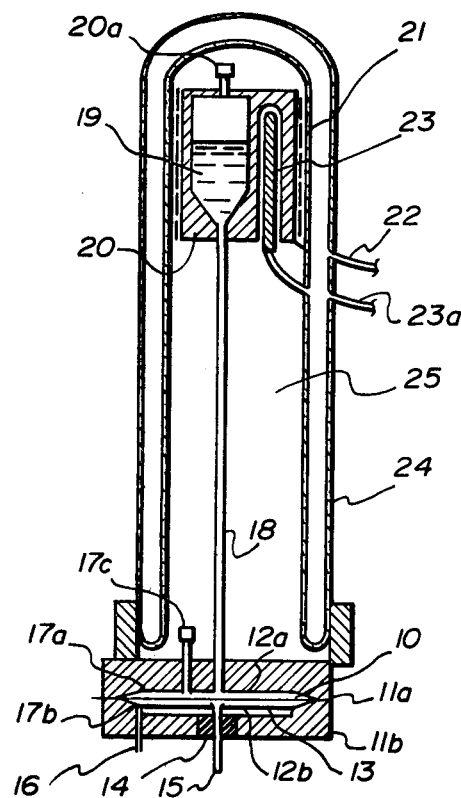
FIG. 1 is a cross-section view of a vapor pressure barometer.

Referring specifically to FIG. 1, a very flexible spring type material diaphragm 10 is clamped and centrally positioned in a cavity formed between the halves 11a and 11b of a high thermal conductivity material (preferably copper) housing. The diaphragm is positioned between backing plates 12a and 12b which in effect are the upper and lower walls of the cavity to prevent rupture that might be caused by large pressure differentials and acts as one plate of a capacitor for mesuring pressure by sensing equality between the internal and atmospheric pressures. The other plate 13 of the capacitor is positioned in the cavity in relation to the diaphragm and is electrically insulated from the copper housing by suitable electrical (e.g. mica) insulation material 14. An electrode 15 leads from the capacitor plate 13 through the insulation to the exterior where it is connected to the measuring circuitry. An opening 16 from the lower part of the cavity 17b leads through the housing to the atmosphere or to the pressure being measured. Electrode 15 if made hollow could act as the pressure opening into the lower part of the cavity. A liquid filling port 17c is used to fill the upper part of the cavity. The upper part of the cavity 17a which is vacuum tight is connected via a fine pressure transfer tube 18 to a cavity (container) 19 formed in a housing 20 made of high thermal conductivity material such as copper to maintain thermal equilibrium and having filling port 20a. Cavity 17a, tube 18 and the lower part of cavity 19 is filled with a low-boiling point liquid such as anhydrous ether, n-pentane, or carbon disulphide ($CS_2$) with the upper part of the cavity 19 containing only the vapor of the liquid. Surrounding the housing 20 is a heater coil 21 with leads 22 to the exterior. A thermometer (preferably a thermistor) 23 is positioned in a well in the housing 20 with leads 23a to the exterior. Housing 20 is enclosed in vacuum insulation i.e. a small diameter glass dewar 24 with insulation 25 filling the intervening space.

Figure 2:
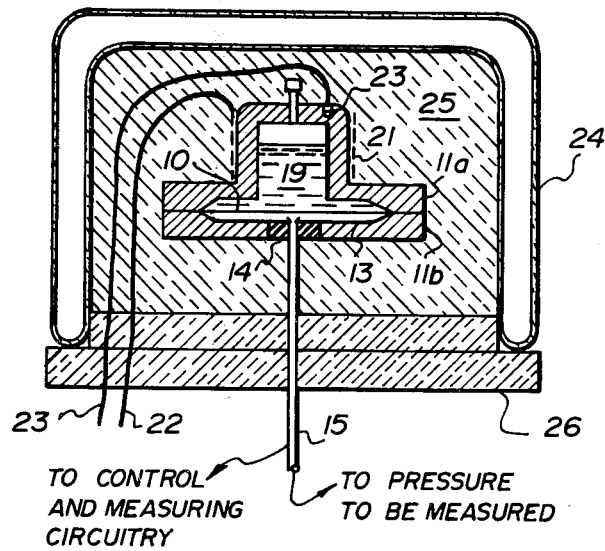
FIG. 2 is a cross-section of a variant form of the device.

FIG. 2 is similar to FIG. 1 but has the two cavities formed into a single cavity in one unitary housing (11a, 11b) containing the diaphragm 10, capacitor plate 13 and electrode 15 leading to the exterior which also acts as the connection to the pressure being measured. A heating coil 21 and thermistor 23 are positioned in relation to the housing with electrical connections 22 and 23a to the exterior. Glass dewar 24, insulation 25, and end plug 26 serve to insulate the device from the ambient temperature. This arrangement has the advantage of reducing the hydrostatic head of liquid 19 above the diaphragm but makes the thermal insulating somewhat more difficult.

Figure 3:
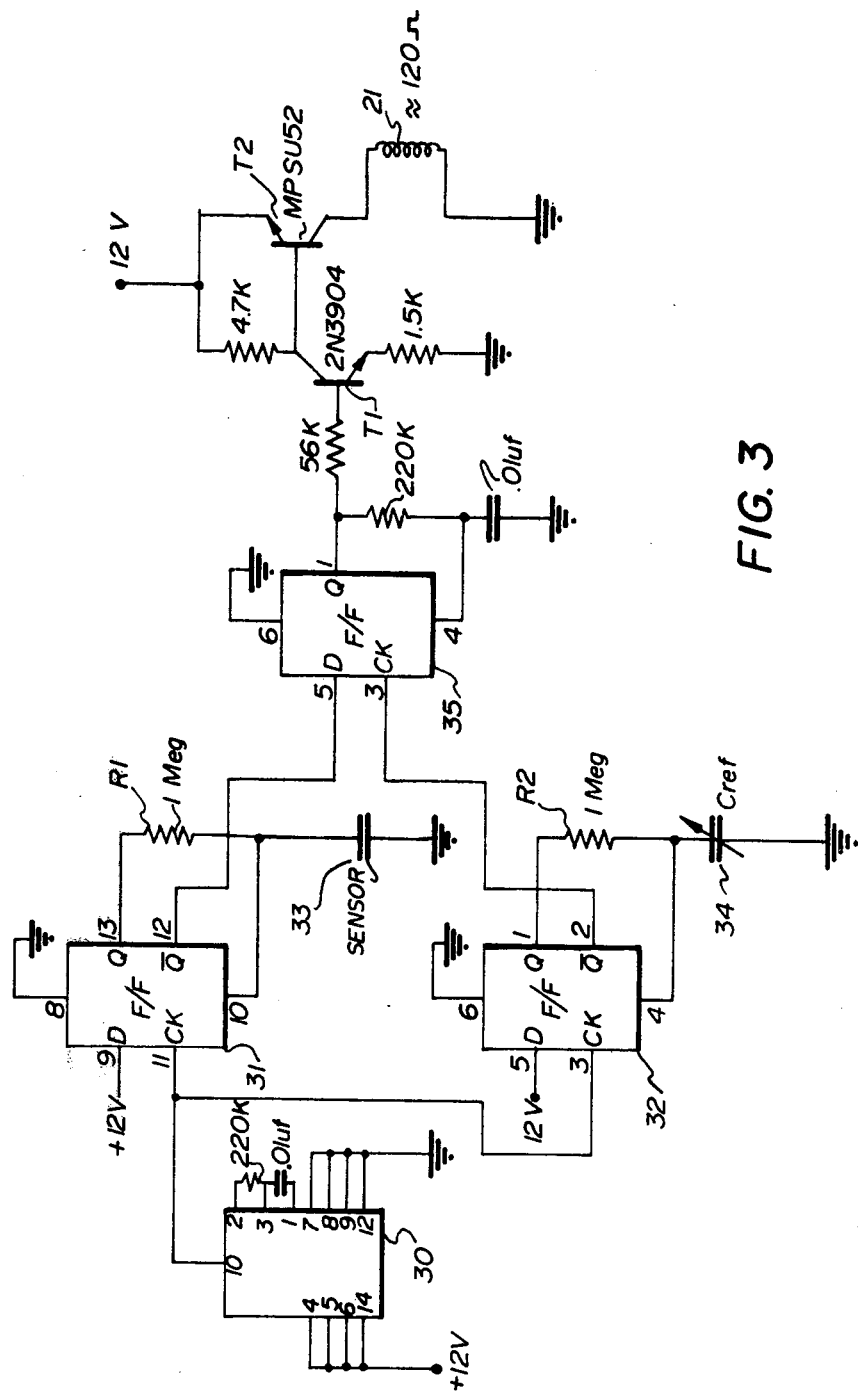
FIG. 3 is a circuit diagram of possible temperature control for the barometer.

FIG. 3 is a power circuit for the heating coil. The output of clock pulse generator 30 is applied to flip-flops 31 and 32 whose time constants are controlled by resistor R1 and capacitor 33 (diaphragm 10 and capacitor plate 13 of FIG. 1) and resistor R2 and variable reference capacitor 34. The outputs are applied to the two inputs of flip flop 35 which provides a series of pulses to control heating current flow to the heater coil 21 by means of transistor pair T1 and T2. A series of pulses is applied to the heater which at intervals as dictated by the balance between the capacitors 33 and 34 some of the pulses being cancelled out. Other types of control circuits such as bridges can be used.

In operation, the diaphragm sensing device controls the power applied to heater 21 preferably in the on-off mode for maximum efficiency. In effect, the temperature of the liquid is controlled to maintain an equalized pressure across the diaphragm and thus between the vapor pressure of the liquid and the outside pressure being measured.

The barometric pressure is obtained from the following equation:

$$P = (\text{Vapor Pressure})_T + \text{Hydrostatic Head}$$

The vapor pressure is obtained by measuring the temperature (T) of the liquid by the thermometer and from the known temperature/vapor pressure relationship of the liquid used. The hydrostatic head is obtained from the height of the liquid in the cavity and tube above the diaphragm and for a fixed design becomes an instrument constant. After suitable calibration, the output temperature reading can be made to indicate directly in terms of pressure.

I claim:
1. Apparatus for measuring barometric pressures comprising:
   (a) a housing made of high thermal conductivity metal and defining a cavity therein,
   (b) a diaphragm of flexible spring type material clamped in a position across the cavity dividing it into upper and lower portions,
   (c) a connecting passage leading from the lower portion of the cavity to the pressure to be measured,
   (d) a low boiling point liquid filling part of the upper portion of the cavity in the housing with vapor from the liquid filing the remaining part,
   (e) means for measuring deflections of the diaphragm and providing a control signal to a power supply,
   (f) a heating coil positioned in relation to the housing and connected to the power supply controlled by the electrical means such as to bring the temperature of the liquid and thus its vapor pressure to a level to balance the pressures across the diaphragm,
   (g) thermal insulation encompassing the housing, and
   (h) means for measuring the temperature of the housing and the liquid therein, this temperature being related to the pressure being measured.
2. Apparatus for measuring barometric pressure comprising:
   (a) a first housing made of metal and defining a cavity therein,
   (b) a diaphragm of flexible spring type material clamped in a central position across the cavity dividing it into two portions;
   (c) a connecting passage leading from one portion of the cavity to the pressure to be measured.
   (d) a second housing made of high thermal conductivity material and defining an enclosed liquid containing cavity therein,
   (e) an elongated thin tube leading from the second portion of the cavity in the first housing to the cavity in the second housing,
   (f) a low boiling point liquid filling the second portion of the cavity in the first housing, the tube, and the lower part of the cavity in the second housing, with vapor from the liquid filling the remaining part,
   (g) electrical means for measuring deflections of the diaphragm and providing a control signal to a power supply,
   (h) a heating coil positioned in relation to the second housing and connected to the power supply controlled by the electrical means sush as to bring the temperature of the liquid and thus its vapor pressure to a level to balance the pressures across the diaphragm,
   (i) thermal insulation encompassing the second housing and the elongated tube, and
   (j) means for measuring the temperature of the second housing and the liquid therein, this temperature being related to the pressure being measured.
3. Apparatus for measuring barometric pressure as in claim 1 or claim 2 wherein the thermal insulation includes a thin walled dewar flask.
4. Apparatus for measuring barometric pressure as in claim 1 or claim 2 wherein the electrical means is a capacitor formed by the metal diaphragm and a second capacitor plate positioned in the cavity in spaced relation to the diaphragm and electrically insulated from the housing with electrical leads to the exterior.

* * * * *